(12) United States Patent
Okamoto et al.

(10) Patent No.: US 9,592,762 B2
(45) Date of Patent: Mar. 14, 2017

(54) VEHICLE DRIVING ASSISTANCE APPARATUS

(71) Applicant: USHIO DENKI KABUSHIKI KAISHA, Tokyo (JP)

(72) Inventors: Masashi Okamoto, Hyogo (JP); Hidekazu Hatanaka, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/013,565

(22) Filed: Feb. 2, 2016

(65) Prior Publication Data

US 2016/0221493 A1    Aug. 4, 2016

(30) Foreign Application Priority Data

Feb. 2, 2015 (JP) ................. 2015-018067

(51) Int. Cl.
*G08G 1/09* (2006.01)
*B60Q 1/26* (2006.01)

(52) U.S. Cl.
CPC ..................... *B60Q 1/26* (2013.01)

(58) Field of Classification Search
CPC ........................................................ B60Q 1/26
USPC ....................................................... 340/905
See application file for complete search history.

(56) References Cited

U.S. PATENT DOCUMENTS 5,699,056 A * 12/1997 Yoshida ................. G01C 21/26
340/905
6,733,134 B2   5/2004 Bleiner
7,287,884 B2  10/2007 Koike
7,561,180 B2 *  7/2009 Koike ..................... B60Q 1/484
340/903
2011/0301813 A1* 12/2011 Sun ...................... B62D 15/029
701/41

FOREIGN PATENT DOCUMENTS

| JP | H05-238307 A | 9/1993 |
| JP | 2003-231438 A | 8/2003 |
| JP | 2003-231450 A | 8/2003 |
| JP | 2003-285685 A | 10/2003 |
| JP | 2004-526612 A | 9/2004 |
| JP | 2011-157022 A | 8/2011 |

* cited by examiner

*Primary Examiner* — Kerri McNally
(74) *Attorney, Agent, or Firm* — Michael Best & Friedrich LLP

(57) ABSTRACT

A vehicle driving assistance apparatus includes a coherent light source, a road surface projection optical system, a road surface wet information retention section, and a control circuit. The road surface projection optical system scans a light source beam emitted from the coherent light source to output a projection beam, and thereby project the light pattern on the road surface around the own vehicle, the light source beam being light. The control circuit is configured to stop the output of the projection beam during a period in which the road surface wet information retention section retains information indicating that the road surface around the own vehicle is wet. The projection beam enters the road surface around the own vehicle at a shallow angle, and projects the light pattern toward a road surface near a boundary of a traveling lane where the own vehicle is traveling.

5 Claims, 2 Drawing Sheets

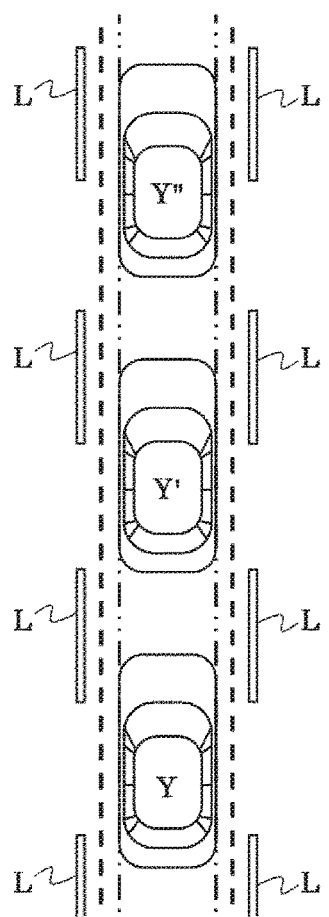
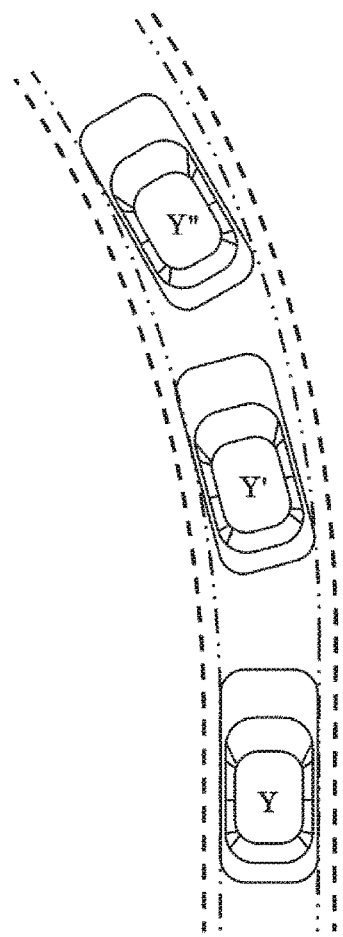
FIG.3A                    FIG.3B

VEHICLE DRIVING ASSISTANCE APPARATUS

CROSS REFERENCE TO RELATED APPLICATIONS

This application claims the benefit of Japanese Priority Patent Application JP 2015-018067 filed on Feb. 2, 2015, the entire contents of which are incorporated herein by reference.

BACKGROUND

The present disclosure relates to a vehicle driving assistance apparatus that scans light emitted from a coherent light source such as a semiconductor laser, to draw a predetermined light pattern on a road surface around an own vehicle, and enables a driver of the own vehicle, drivers of other vehicles, pedestrians, and an environmental condition detector to recognize the drawn light pattern, thereby contributing road safety.

As an existing technology that displays any light pattern on a road surface around an own vehicle with use of a laser beam such as a semiconductor laser and enables a driver of the own vehicle, drivers of other vehicles, pedestrians, and an environmental condition detector to recognize the displayed light pattern, for example, a technology disclosed in Japanese Unexamined Patent Application Publication No. H05-238307 (JP-H05-238307A) is exemplified. The technology disclosed in JP-H05-238307A projects a visible spot marker or a diagram such as a polygon through scanning with use of a two-dimensional galvanometer, on a front position distanced by a predetermined length from the vehicle on a road surface. This makes it possible to enable pedestrians and drivers of other vehicles to recognize presence of the own vehicle.

Further, in Japanese Unexamined Patent Application Publication No. 2003-231450 (JP2003-231450A), disclosed is a technology in which an image pickup apparatus acquires a light pattern formed on a road surface by a laser beam that is emitted by the own vehicle and other vehicles and a condition to be noted in traveling of the own vehicle is determined based on information of the light pattern. In this technology, a traveling track where the own vehicle is supposed to travel is calculated based on a vehicle speed, a motion state quantity, a steering angle, and steering force of the own vehicle. Right and left boundaries between a zone where the vehicle passes and a zone where the vehicle does not pass in a case where the own vehicle is assumed to travel on the calculated traveling track are calculated, and a scan actuator scans a laser beam to draw a part of the boundaries necessary for safety depending on the speed and other factors.

Further, in Japanese Unexamined Patent Application Publication (Translation of PCT Application) No. 2004-526612 (JP2004-526612A), disclosed is a technology of displaying a light pattern on a road surface behind the own vehicle with use of a method used in a field of illumination effect for a spectacular show, and providing a following vehicle with information when an accident occurs or the own vehicle is urgently stopped.

These technologies just mentioned above are based on the assumption that the laser beam forming the light pattern projected on the road surface is irregularly reflected by the road surface and is diffused substantially uniformly in all directions less depending on an entering direction of the light. When the road surface is wet in the rain, however, in particular, in a case of a light beam entering the road surface at a shallow angle (i.e., an angle formed by the light beam with the road surface is small), such assumption is not established and a regularly reflected component dominates. Thus, if the regularly reflected component of the laser beam that forms the light pattern projected on the road surface directly enters eyes of a driver of an oncoming vehicle accidentally, the driver is strongly dazzled, which may cause occurrence of a traffic accident.

To address such a disadvantage of dazzlement, for example, Japanese Unexamined Patent Application Publication No. 2003-231438 (JP2003-231438A) discloses a technology of applying, with consideration for a wet road surface, a visible beam while avoiding a pedestrian when the pedestrian as an obstacle is detected based on contrast of an image of the road surface irradiated with the laser beam that forms the light pattern projected on the road surface. The image of the road surface is picked-up by an image pickup apparatus.

Further, Japanese Unexamined Patent Application Publication No. 2003-285685 (JP2003-285685A) discloses a technology in which a glass plate that forms a Brewster angle with respect to a beam from a semiconductor laser is interposed with consideration for the wet road surface. JP2003-285685A teaches that, in doing so, a polarized component parallel to the road surface is reflected by the glass plate and removed, which may prevent the laser beam forming the light pattern projected on the road surface from being regularly reflected strongly even by the wet road surface, and thus may resolve the disadvantage of dazzlement to the pedestrians and drivers of other vehicles.

Further, Japanese Unexamined Patent Application Publication No. 2011-157022 (JP2011-157022A) discloses a vehicle head lamp that makes it possible to dynamically generate a desired light distribution pattern through scanning the beam from the semiconductor laser while modulating intensity of the beam. The light of the vehicle head lamp is dimmed or is turned off in a region closer to the vehicle than a region where a light distribution pattern of a normal low beam is applied, as a light distribution pattern for rainy weather.

SUMMARY

A vehicle driving assistance apparatus according to an embodiment of the technology is installed in a vehicle and configured to display a predetermined light pattern on a road surface around an own vehicle to enable a driver of the own vehicle, a driver of another vehicle, a pedestrian, and an environmental condition detector to recognize the displayed light pattern. The vehicle driving assistance apparatus includes: a coherent light source; a road surface projection optical system configured to scan a light source beam to output a projection beam, and thereby project the light pattern on the road surface around the own vehicle, in which the light source beam is light emitted from the coherent light source; a road surface wet information retention section configured to retain information indicating whether the road surface around the own vehicle is wet; and a control circuit configured to control the coherent light source and the road surface projection optical system. The control circuit is configured to stop the output of the projection beam during a period in which the road surface wet information retention section retains information indicating that the road surface around the own vehicle is wet. The projection beam enters the road surface around the own vehicle at a shallow angle, and projects the light pattern toward a road surface near a boundary of a traveling lane where the own vehicle is traveling.

It is possible to provide the vehicle driving assistance apparatus that inhibits the regularly reflected component of the laser beam that forms the light pattern projected on the road surface from dazzling the drivers of the other vehicles when the road surface is wet in the rain.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 3A and 3B are schematic diagrams each illustrating a concept relating to a technology of the vehicle driving assistance apparatus according to the embodiment of the disclosure.

DETAILED DESCRIPTION

Figure 1:
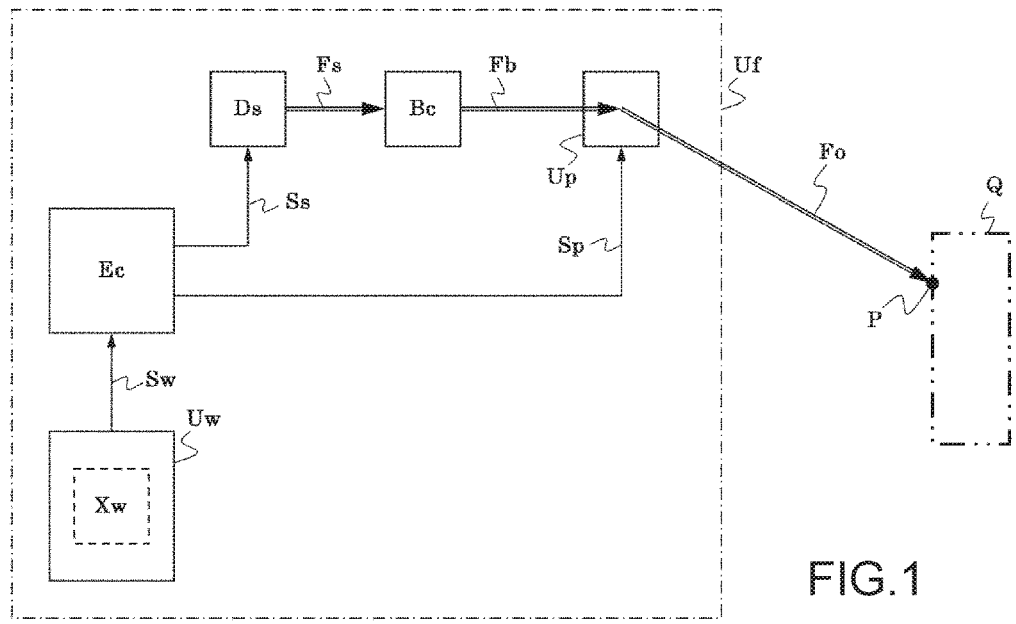
FIG. 1 is a block diagram illustrating a vehicle driving assistance apparatus according to an embodiment of the disclosure in a simplified manner.

First, a configuration of a vehicle driving assistance apparatus according to an embodiment of the disclosure is described with reference to FIG. 1 that is a block diagram illustrating the vehicle driving assistance apparatus in a simplified manner. As illustrated in FIG. 1, the vehicle driving assistance apparatus (Uf) includes a road surface projection optical system (Up), a road surface wet information retention section (Uw), and a control circuit (Ec). The vehicle driving assistance apparatus (Uf) further includes a conversion optical system (Bc) and a coherent light source (Ds). The conversion optical system (Bc) provides a light source beam (Fb) to the road surface projection optical system (Up), and the coherent light source (Ds) provides emitted light (Fs) to the conversion optical system (Bc). The control circuit (Ec) performs control of the coherent light source (Ds) and the road surface projection optical system (Up). The emitted light (Fs) from the coherent light source (Ds) is converted into the light source beam (Fb) by the conversion optical system (Bc). The light source beam (Fb) is then provided to the road surface projection optical system (Up). The light source beam (Fb) may have a thickness suitable for being projected far away. Note that the conversion optical system (Bc) may be provided as necessary. Examples of the conversion optical system (Bc) may include a collimator lens and a beam expander. Also, examples of the coherent light source (Ds) may include a light source that converts a wavelength of semiconductor laser or emitted light from a semiconductor laser with use of a non-linear optical phenomenon such as high frequency generation and optical parametric effect.

The road surface projection optical system (Up) may include a two-dimensional deflector. The two-dimensional deflector may include two optical deflection devices such as an acousto-optical deflection device (AOD) and a galvanometer mirror that are so disposed as to be orthogonal in a deflection direction to each other. The two-dimensional deflector may independently drive the two optical deflection devices to emit the received beam toward an optional direction. In a case where the optical deflection device is the galvanometer mirror, a deflection angle of each of the two optical deflection devices may be defined based on a magnitude of a drive current flowing through a coil. In a case where the optical deflection device is the acousto-optical deflection device, the deflection angle of each of the two optical deflection devices may be defined based on a frequency of a high-frequency drive voltage applied to an ultrasonic wave transducer. The light source beam (Fb) that has entered the road surface projection optical system (Up) may be deflected in directions of azimuth angles $\theta$ and $\psi$ into a projection beam (Fo) to be emitted to an outside of the vehicle driving assistance apparatus (Uf). The emitted projection beam (Fo) may reach the road surface around the own vehicle to form a beam spot (P). Dynamically changing the azimuth angles $\theta$ and $\psi$ may continuously move the beam spot (P), which enables the road surface projection optical system (Up) to project an optional light pattern (Q) such as a straight line, a curved line, a circle, a polygon, and a character, on the road surface around the own vehicle.

The azimuth angles $\theta$ and $\psi$ used herein are defined below for convenience of the following description. When directing the traveling direction of the vehicle in straight traveling in a state where the vehicle driving assistance apparatus (Us) is installed in the vehicle, a depression angle that is an angle of the deflected beam in a perpendicular plane, namely, an angle formed by the light beam with the road surface is denoted by $\theta$, and an angle of the light beam in a horizontal plane is denoted by $\psi$, where an axis parallel to the flat road surface is referred to as a z-axis. Further, both of the angles $\theta$ and $\psi$ are referred to as the azimuth angles.

The control circuit (Ec) modulates electric power supplied to the coherent light source (Ds) with use of a light source modulation signal (Ss), controls the coherent light source (Ds) to be turned on or off, and controls intensity of light in lighting. Further, the control circuit (Ec) may transmit target values $\theta p$ and $\psi p$ of the azimuth angles $\theta$ and $\psi$ to the road surface projection optical system (Up) with use of a target azimuth angle signal (Sp). A drive circuit included in the road surface projection optical system (Up) may control the drive current and the drive voltage of the optical deflection devices to achieve the target azimuth angles $\theta p$ and $\psi p$.

The road surface wet information retention section (Uw) may provide a road surface wet detection signal (Sw) to the control circuit (Ec). The road surface wet detection signal (Sw) is information indicating that the road surface around the own vehicle is wet. Note that a method enabling the road surface wet information retention section (Uw) to acquire information whether the road surface around the own vehicle is wet is described later. During a period in which the road surface wet detection signal (Sw) is active, namely, a period in which the control circuit (Ec) acquires the information indicating that the road surface around the own vehicle is wet, the control circuit (Ec) controls one or both of the coherent light source (Ds) and the road surface projection optical system (Up) to stop the output of the projection beam (Fo) that enters the road surface at a shallow angle and projects the light pattern (Q) toward the road surface near the boundary of the traveling lane where the own vehicle is traveling.

Here, as a reference to determine that the entering angle to the road surface is shallow, a model in which a road surface is simply assumed to be a flat water surface is considered and the vehicle driving assistance apparatus (Uf) is assumed to be configured such that the projection beam (Fo) becomes P-polarized wave with respect to the water surface. In this state, for example, a lower limit of the angle θ formed by the light beam with the road surface may be about 11.2 degrees at which the reflectance becomes 20% or about 8.5 degrees at which the reflectance becomes 30%. Incidentally, rainwater standing on the road surface may be not pure water. In addition, oil films may often exist on the surface of the rainwater that is not flat. Thus, the reflectance of the road surface may be not obtained by a simple function of only of the angle θ, and the reflectance of the road surface may differ depending on a part of the road surface even at the same angle θ. Accordingly, even if a tolerable reflectance of the road surface is determined, the lower limit of the angle θ formed by the light beam with the road surface that is used to determine that the entering angle to the road surface is shallow may be not uniquely determined by theoretical considerations, and experimentally determining the lower limit is more appropriate.

The value of the reflectance mentioned above may be easily calculated through calculation of a well-known Fresnel coefficient. More specifically, an angle formed by a normal of the water surface with the light beam, namely, the entering angle φ (where φ=90−θ) is determined. A refraction angle χ is related with the entering angle φ by the following expression through a value 1.333 of a refraction index n of the water.

$$\sin \chi = \sin \phi / n$$

Accordingly, a power reflectance (the square of Fresnel coefficient serving as an amplitude reflectance) may be calculated by the following expression.

$$R = \{\tan(\phi-\chi)/\tan(\phi+\chi)\}^2$$

Where, a symbol "^2" indicates a square.

To stop the output of the projection beam (Fo) projecting the light pattern (Q), for example, as the simplest way, the control circuit (Ec) may control the road surface projection optical system (Up) and the coherent light source (Ds) with indifference whether the road surface around the own vehicle is wet. Then, the control circuit (Ec) may additionally perform control to turn off the coherent light source (Ds) when the projection contents are the light pattern with respect to the road surface near the boundary of the traveling lane where the own vehicle is traveling, the angle θ or the target angle θp is equal to or lower than the lower limit, and the road surface wet detection signal (Sw) is active. Incidentally, in the case of such simple control, the road surface projection optical system (Up) uselessly operates even during a period in which the coherent light source (Ds) is off by the additional control. Thus, the control circuit (Ec) may perform control to omit a part, of the control sequence, after the angle θ or the target angle θp becomes equal to or lower than the lower limit until the angle θ or the target angle θp exceeds the lower limit again, which makes it possible to avoid the useless operation mentioned above.

The traveling lane mentioned above refers to a region formed in the following manner. The projection of the body of the own vehicle at a certain moment on the road surface is moved along with the traveling of the vehicle and the projected regions are synthesized in a sum-set and cumulative manner to form an own vehicle occupying road surface track. The traveling lane mentioned above is formed by adding an allowance in a width direction necessary for safety to the own vehicle occupying road surface track. Therefore, for example, when the vehicle travels along a vehicular lane, the traveling lane and the vehicular lane are substantially same as long as a width of the vehicular lane is not excessively large. When the vehicle changes the traveling lane or turns left or right, however, the vehicle crosses over the boundary of the vehicular lane. During a period from the start to the completion of the action, the traveling lane is different from the vehicular lane, and it is necessary to consider the traveling lane as the region (the region formed by adding an allowance in a width direction necessary for safety to the own vehicle occupying road surface track) mentioned above. Further, it is necessary to consider the traveling lane as the region mentioned above in a place where the vehicular lane is not set by pavement markings.

There is described one reason why the condition to stop the output of the projection beam (Fo) projecting the light pattern (Q) is based on: shallow entering angle of the projection beam (Fo) to the road surface; and projection of the light pattern (Q) on the road surface near the boundary of the traveling lane where the own vehicle is traveling. First, when the projection beam (Fo) enters the road surface at a deep angle, the reflectance of the projection beam (Fo) on the road surface may be low and the regularly reflected component of the projection beam (Fo) that has been reflected by the road surface may escape upward. Thus, dazzlement may be not applied to drivers of oncoming vehicles, preceding vehicles and following vehicles that are traveling in the same direction as that of the own vehicle, and vehicles traveling in front left, front right, rear left, or rear right of the own vehicle. Accordingly, it is understood that the case where the projection beam (Fo) enters the road surface at a deep angle is excludable from the condition to stop the output of the projection beam (Fo).

For example, there is considered a case where the projection target is not the road surface near the boundary of the traveling lane where the own vehicle is traveling, for example, a case where the light pattern to be projected on the road surface near the direction of ψ=0 exists when the own vehicle is traveling straightly. In such a case, first, a downward projection beam may hit the body of the preceding vehicle when the preceding vehicle is close to the own vehicle. Second, when the preceding vehicle is slightly far from the own vehicle and the projection beam is reflected by the wet road surface in front of the own vehicle, the reflected light may hit the body of the preceding vehicle. Even if the reflected light enters the inside of the preceding vehicle from a rear window thereof, the entered light only hits a ceiling of the preceding vehicle because the entered light is directed upward even in a case where the entered light is reflected by a room mirror. Third, when the preceding vehicle is far from the own vehicle, the regularly reflected light that has been reflected by the wet road surface may enter eyes of the driver of the preceding vehicle through the room mirror; however, the intensity of the regularly reflected light is sufficiently small because of the distance. Accordingly, in any case, the projection beam (Fo) does not dazzle the driver of the preceding vehicle. Thus, it is understood that the case where the projection target is not the road surface near the boundary of the traveling lane where the own vehicle is traveling is excludable from the condition to stop the output of the projection beam (Fo).

The projection of the optical pattern just mentioned above is necessary for securing safety in the case where the vehicle driving assistance apparatus (Uf) is used together with the environmental condition detector. The detector may include, for example, an image pickup device to acquire the reflected scattered light of the light pattern as an image, identify whether a reflection scattering body is road, a preceding vehicle, or an obstacle, and extract information of safety state of the environment in front of the own vehicle. According to the embodiment of the technology, safety is advantageously secured without stopping the output of the projection beam (Fo) for the environmental condition detector even if it rains.

As mentioned above, the vehicle driving assistance apparatus (Uf) according to the embodiment of the disclosure scans the emitted light (Fs) from the coherent light source (Ds) such as a semiconductor laser, draws the predetermined light pattern (Q) on the road surface around the own vehicle, and enables a driver of the own vehicle, drivers of other vehicles, pedestrians, and the environmental condition detector to recognize the drawn light pattern (Q). This contributes road safety and inhibits the regularly reflected component of the laser beam that forms the light pattern projected on the road surface from dazzling the drivers of the other vehicles when the road surface is wet in the rain. This makes it possible to prevent occurrence of a traffic accident caused by dazzlement.

Even if the projection target is not the road surface near the boundary of the traveling lane where the own vehicle is traveling, it is desirable to stop the output of the projection beam (Fo) projecting the light pattern (Q) on the road surface in front of a following vehicle traveling on the traveling lane same as that of the own vehicle when it rains. One reason for this is that the regularly reflected light from the road surface in this situation may directly enter eyes of a driver of the following vehicle with high possibility. Incidentally, the projection of the light pattern (Q) just mentioned above may be useful to, for example, display a mark indicating a limit position of a distance between vehicles depending on a traveling speed on the road surface to enable the driver of the following vehicle to recognize the mark, thereby preventing a rear-end collision.

Providing a dedicated road surface wet detector (Xw) may be most reliable to realize the road surface wet information retention section (Uv). A specific but non-limiting example of the configuration of the road surface wet detector (Xw) is described below. For example, an optical flux having an appropriate wavelength and known intensity may be applied obliquely to the road surface and intensity of the regularly reflected light may be measured. When a ratio of the intensity of the regularly reflected light to the intensity of the applied optical flux is equal to or higher than a specified value, the road surface wet detector (Xw) may output the road surface wet detection signal (Sw) that is information indicating that the road surface around the own vehicle is wet. The road surface wet detector (Xw) of the type just mentioned above may be disposed at a position, of a bottom surface of the body of the own vehicle, facing the road surface. Alternatively, an electric circuit device whose electric parameter such as an electric conductivity and an electrostatic capacitance is varied when being wet may be disposed on, for example, a roof of the own vehicle, and the road surface wet detection signal (Sw) may be generated with use of a rain sensor. The rain sensor may detect raining based on whether a value of the electric parameter exceeds a specified threshold.

Further, the road surface projection optical system (Up) of the vehicle driving assistance apparatus (Uf) may project a test light pattern on a specific position of the road surface around the own vehicle. The reflected scattered light of the test light pattern may be acquired as an image with use of, for example, an image pickup device provided in the road surface projection optical system (Up), and the road surface wet detection signal (Sw) may be generated through analysis of the acquired image. Here, a position near the direction of ψ=0 where the projection beam (Fo) entering the road surface at non-shallow angle is projected is suitable as the specific position mentioned above in order to eliminate possibility of the dazzlement caused by the test light pattern to the drivers of the other vehicles. Alternatively, as described later, a component that is inversely returned through the road surface projection optical system (Up), out of the rear scattered light on the road surface of the projection beam (Fo), may be detected without using the image pickup device, and the road surface wet detection signal (Sw) may be generated based on the intensity of the component.

Instead of the road surface wet information retention section (Uw) that is realized by including the dedicated road surface wet detector (Xw) described above, as a simpler method, for example, the road surface wet detection signal (Sw) may be outputted when a switch to operate windshield wipers is on. Alternatively, a driver himself may determine whether the road surface around the own vehicle is wet. When the driver determines that the road surface around the own vehicle is wet, the driver may manually turn on a switch to output the road surface wet detection signal (Sw).

One fundamental note is supplementarily given here. A question may arise that it would be better not to stop the output of the projection beam in order to secure safety even though the projection beam projected at a shallow angle on the road surface in the rain disadvantageously causes a side effect of dazzlement to a driver of an oncoming vehicle. The projection beam of such a condition, however, does not form, on the road surface, a light pattern recognizable by a human and the environment condition detector. This is easily understood by an experience that a point irradiated with a laser pointer is visible on white paper but is invisible on a mirror surface. Therefore, if such a projection beam is outputted, no safety is provided to the own vehicle. Such a projection beam may escape upward, wastefully hit the other vehicles, or dazzle the driver of the oncoming vehicles as a side effect to enhance accident risk of the oncoming vehicle. Accordingly, it is necessary to stop the output of the projection beam under the above-described condition as the best way. Safety to be given by the projection of the light pattern is not given when it rains. Therefore, to compensate the lowered safety, it is necessary to take any other effective measures beside the measure described in the embodiment of the disclosure.

Figure 2:
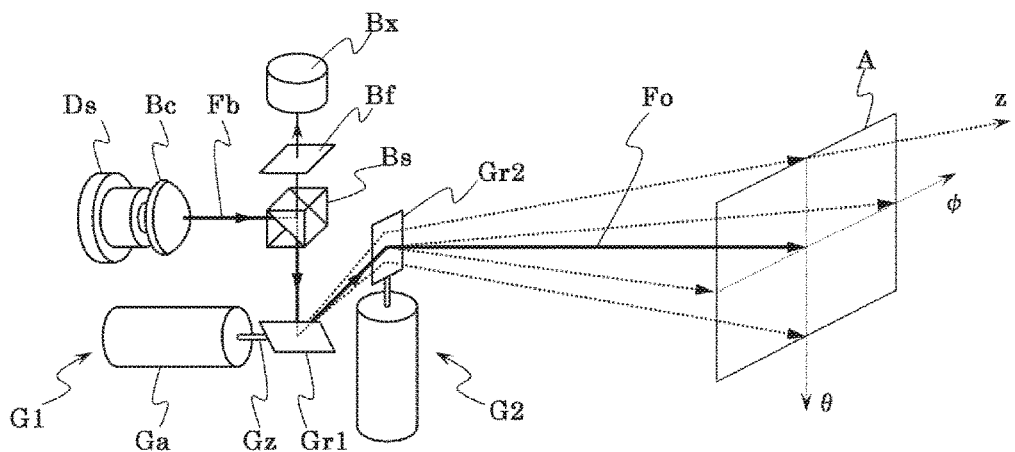
FIG. 2 is a pattern diagram illustrating one mode of a part of the vehicle driving assistance apparatus according to the embodiment of the disclosure.

One embodiment of the disclosure is described below. First, an optical system including the coherent light source (Ds) and the road surface projection optical system (Up) that is configured using a galvanometer mirror is described with reference to FIG. 2. FIG. 2 is a pattern diagram illustrating one mode of a part of the vehicle driving assistance apparatus according to the embodiment of the disclosure. The emitted light from the coherent light source (Ds) that is configured of the semiconductor laser may be converted, through the conversion optical system (Bc), into the light source beam (Fb) including optical fluxes parallel to one another. The conversion optical system (Bc) may be a collimator using an aspherical lens. The light source beam (Fb) may enter a rotation mirror (Gr1) of a θ-deflection galvanometer mirror (G1) through a polarization beam splitter (Bs) that is described later. The rotation mirror (Gr1) may be fixed to an actuator shaft (Gz) that reciprocatively rotates in response to the drive of an actuator (Ga). The azimuth angle θ after deflection may be controlled by a drive current that is allowed to flow through the actuator (Ga) by the drive circuit (not illustrated) under the control of the control circuit (Ec).

The beam that has been reflected by the rotation mirror (Gr1) may enter a ψ-deflection galvanometer mirror (G2), and the azimuth angle ψ after deflection may be controlled in a similar manner. The ψ-deflection galvanometer mirror (G2) has a configuration similar to that of the θ-deflection galvanometer mirror (G1) and has an actuator shaft orthogonal to the actuator shaft (Gz). The beam that has been reflected by a rotation mirror (Gr2) of the ψ-deflection galvanometer mirror (G2) may be outputted as the projection beam (Fo) from the road surface projection optical system (Up). The projection beam (Fo) may be two-dimensionally deflected in an optional direction in a solid angle region (A) and make it possible to project the light pattern (Q) on the road surface around the own vehicle. Note that as a position where the optical system in the drawing is to be disposed in a vehicle, two points, a right end and a left end of an upper side of a front glass in a cab from which the road surface in front of the vehicle can be seen are suitable. Alternatively, the optical system may be provided at only one position of a center of the upper side of the front glass, namely, a gap between the front glass and a room mirror.

In the case of the galvanometer mirror, a magnetic movable part including the mirror has moment of inertia to rotation. For example, when the drive current is varied in a stepwise manner in order to hop and move the azimuth angle coordinates θ and ψ, the current value does not correspond to the azimuth angles θ and ψ instantaneously because of the moment of inertia. The azimuth angles θ and ψ may rise at a finite speed and approximate to a steady-state value while performing ringing (attenuating oscillation). Accordingly, the azimuth angles θ and ψ may be detected and proportional-integral-derivative (PID) feedback control may be performed to improve a response speed, and the coherent light source (Ds) is turned off with use of the light source modulation signal (Ss) to allow unnecessary track of the beam spot (P) to be invisible during a period in which the ringing or overshooting occurs. As described above, when the driving is so performed as not to hop and move the azimuth angle coordinates θ and ψ, but to gradually vary the azimuth angles θ and ψ in order to project a straight line or a curved line, the ringing is difficult to occur. In such a case, however, error caused by operation delay may occur between the target azimuth angles θp and ψp and the azimuth angles θ and ψ, and as a result, error of the position and the shape of the light pattern (Q) may occur. Therefore, correction is necessary.

Some examples of the configuration of the road surface wet detector (Xw) that generates information indicating whether the road surface around the own vehicle is wet are described above. In FIG. 2, illustration includes a configuration to achieve the road surface wet detector through detection of a component that is inversely returned through the road surface projection optical system (Up) out of the rear scattered light on the road surface of the projection beam (Fo). As mentioned above, suitably, the vehicle driving assistance apparatus (Uf) is so configured as to allow the projection beam (Fo) to become the P-polarized wave to the water surface. Thus, when the coherent light source (Ds) is so disposed as to allow the polarized wave of the projection beam (Fo) to be parallel to the θ direction in the drawing, and the polarization beam splitter (Bs) is so disposed as to match thereto, about 100% of the light source beam (Fb) may be ideally reflected toward the rotation mirror (Gr1). When the projection beam (Fo) hits the road surface to cause the rear scattered light, the polarization plane is typically rotated. Therefore, when the scattered light returns from the road surface through the rotation mirror (Gr2) and the rotation mirror (Gr1), the component that is S-polarized wave with respect to the road surface may pass through the polarization beam splitter (Bs), which may be detected by the light sensor (Bx).

For example, the light sensor (not illustrates) detects the week light of the light source beam (Fb) that has passed through the polarization beam splitter (Bs), which may makes it possible to constantly monitor the intensity of the light source beam. A threshold of the ratio of the amount detected by the light sensor (Bx) to the intensity of the light source beam is determined through an experiment in order to recognize whether the road surface is dry or wet. This makes it possible to allow the configuration to function as the road surface wet detector, and to generate the road surface wet detection signal (Sw).

Note that a narrow band filter (Bf) using, for example, an interference filter may be suitably interposed in front of the light sensor (Bx) in order to avoid influence of sunlight, road illumination light such as light from a street lamp, and disturbance light such as light emitted from other vehicles. Further, to enhance capability to avoid the influence of the disturbance light, amplitude modulation at an appropriate frequency may be performed on the drive current of the coherent light source (Ds), and the road surface wet detection signal (Sw) may be generated based on a signal that has passed through an electric narrow band filter corresponding to the frequency subjected to the amplitude modulation, out of the signal detected by the light sensor (Bx). Alternatively, technologies of synchronous detection and a lock-in amplification circuit may be further used to generate the road surface wet detection signal (Sw) with higher detection accuracy. Also, phase delay of the detection signal with respect to the modulation signal is measured when the detection signal is accurately acquired, which makes it possible to estimate a distance between the own vehicle and the position of the road surface where the projection beam (Fo) is projected.

Next, the vehicle driving assistance apparatus according to the embodiment of the disclosure is described with reference to FIGS. 3A and 3B. FIGS. 3A and 3B are schematic diagrams each illustrating a concept relating to the technology of the vehicle driving assistance apparatus according to the embodiment of the disclosure. FIGS. 3A and 3B illustrate a current position (Y), a future position (Y'), and a further future position (Y") of the vehicle. A region sandwiched by two alternate long and two short dashed lines is a region formed by moving the projection of the body of the own vehicle at a certain moment on the road surface along the traveling of the vehicle and synthesizing the projected regions in a sum-set and cumulative manner. In other words, the region is own vehicle occupying road surface track. A region sandwiched by two dashed lines is a region formed by adding an allowance in a width direction necessary for safety to the own vehicle occupying road surface track, namely, a traveling lane. Incidentally, FIG. 3A illustrates a case where the own vehicle travels straightly, and FIG. 3B illustrates a case where the own vehicle travels around a left curve. Note that pavement markings (L) indicating the boundary of a vehicular lane are illustrated in only FIG. 3A. In FIG. 3B, the illustration of the pavement markings indicating the boundary of the vehicular lane is omitted in order to avoid complication of the illustration. This is because there are a case where the vehicle travels along the pavement markings indicating the boundary of the vehicular lane that makes a curve to the left and a case where the vehicle cuts across the pavement markings indicating the boundary of the vehicular lane to change the traveling lane.

A vehicle driving assistance system installed in the vehicle may determine the shape of the traveling lane through simulation of the ever-changing position and the ever-changing direction of the own vehicle on the road surface until the near future. The vehicle driving assistance system may perform the simulation with use of a current steering angle by the driver, a change rate of the steering angle by steering, a current speed of the vehicle, an acceleration rate by operation of an accelerator, and an analysis of the road condition in front of the vehicle acquired with use of an image pickup device. The vehicle driving assistance system may determine the shape of the light pattern to be projected on the road surface near the boundary of the traveling lane where the own vehicle is traveling, to enable the driver of the own vehicle, drivers of other vehicles, pedestrians, and the environmental condition detector to recognize the light pattern. Here, there may be a case where the light pattern to be projected is a boundary of the traveling lane itself. The length of the light pattern to be projected may depend on the speed of the own vehicle, and a priority area of the light pattern to be projected may become farther from the vehicle as the speed of the own vehicle is high.

The vehicle driving assistance system may convert information indicating the shape of the light pattern to be projected, from the plane coordinates on the road surface into the azimuth angle coordinates $\theta$ and $\psi$. The vehicle driving assistance system may transmit, to the control circuit (Ec) of the vehicle driving assistance apparatus (Uf) according to the embodiment of the disclosure, data of the converted information, for example, as a sequence of the target azimuth angles $\theta p$ and $\psi s$. The control circuit (Ec) may repeatedly read out the received sequence of the target azimuth angles $\theta p$ and $\psi p$, and generate the light source modulation signal (Ss) and the target azimuth angle signal (Sp) to control the coherent light source (Ds) and the road surface projection optical system (Up).

Incidentally, when the road surface wet information retention section (Uw) retains the information indicating that the road surface around the own vehicle is wet, namely, when the road surface wet detection signal (Sw) is active, the control circuit (Ec) may control the light source modulation signal (Ss) to turn off the coherent light source (Ds) and thereby stop the output of the projection beam (Fo) that enters the road surface at the shallow angle and projects the light pattern (Q) toward the road surface near the boundary of the traveling lane where the own vehicle is traveling. Here, the control circuit (Ec) may stop the output of the projection beam (Fo), during a period in which the road surface projection optical system (Up) indicates a part of the sequence of the angles $\theta p$ and $\psi p$ having the target angle $\theta p$ lower than the lower limit of the angle $\theta$ formed by the light beam with the road surface that is used to determine that the entering angle to the road surface is shallow.

Here, when the road surface is wet and the angle $\theta$ is lower than the lower limit, it is necessary to determine, depending on the situation, whether the projection beam to be stopped is a right beam or a left beam, out of the light pattern projected on the road surface near the boundary of the traveling lane where the own vehicle is traveling. When the vehicle keeps to the left, the outside of the left boundary of the traveling lane is an end of the roadway (a sidewalk or a side strip) or a vehicular lane where the vehicles travel in the same direction, not a vehicular lane where oncoming vehicles travel. Therefore, when the vehicle goes straightly or goes around the left curve, it is unnecessary to stop the projection beam projecting the light pattern on the road surface near the left boundary of the traveling lane, even if the road surface is wet and the angle $\theta$ is lower than the lower limit. Incidentally, when it is determined that the dazzlement to the pedestrians is to be avoided, the projection beam is stopped even under the condition. When the vehicle goes around a right curve, the light regularly reflected by the wet road surface may directly enter the eyes of the driver of the oncoming vehicle. Thus, it is necessary to stop the output of the projection beam projecting the light pattern on the road surface near the left boundary of the traveling lane. In contrast, the outside of the right boundary of the traveling lane may be a traveling lane of the oncoming vehicles travel. Therefore, it is necessary to stop the output of the projection beam projecting the light pattern on the road surface near the right boundary of the traveling lane when the road surface is wet and the angle $\theta$ is lower than the lower limit even in any case where the vehicle goes straightly or goes around a right curve.

It should be understood by those skilled in the art that various modifications, combinations, sub-combinations, and alterations may occur depending on design requirements and other factors insofar as they are within the scope of the appended claims or the equivalents thereof.

What is claimed is:

1. A vehicle driving assistance apparatus installed in a vehicle and configured to display a predetermined light pattern on a road surface around an own vehicle to enable a driver of the own vehicle, a driver of another vehicle, a pedestrian, and an environmental condition detector to recognize the displayed light pattern, the vehicle driving assistance apparatus comprising:
   a coherent light source;
   a road surface projection optical system configured to scan a light source beam to output a projection beam, and thereby project the light pattern on the road surface around the own vehicle, the light source beam being light emitted from the coherent light source;
   a road surface wet information retention section configured to retain information indicating whether the road surface around the own vehicle is wet; and
   a control circuit configured to control the coherent light source and the road surface projection optical system, the control circuit being configured to stop the output of the projection beam during a period in which the road surface wet information retention section retains information indicating that the road surface around the own vehicle is wet, the projection beam entering the road surface around the own vehicle at a shallow angle, and projecting the light pattern toward a road surface near a boundary of a traveling lane where the own vehicle is traveling.

2. The vehicle driving assistance apparatus according to claim 1, wherein, during the period in which the road surface wet information retention section retains the information indicating that the road surface around the own vehicle is wet, the control circuit stops the output of the projection beam, the projection beam projecting the light pattern on the road surface in front of a following vehicle that is traveling in a traveling lane same as the traveling lane where the own vehicle is traveling.

3. The vehicle driving assistance apparatus according to claim 1, wherein the road surface information retention section includes a road surface wet detector configured to detect whether the road surface around the own vehicle is wet to generate a road surface wet detection signal, the road surface wet detection signal indicating whether the road surface around the own vehicle is wet.

4. A vehicle driving assistance apparatus comprising:
   a coherent light source configured to emit a light source beam;
   a road surface projection optical system configured to scan the light source beam and to project a light pattern on a road surface;
   a road surface wet information retention section configured to retain information indicating whether the road surface is wet; and
   a control circuit configured to control the coherent light source and the road surface projection optical system, the control circuit being configured to stop the output of the projection beam during a period in which the road surface wet information retention section retains information indicating that the road surface is wet.

5. The vehicle driving assistance apparatus according to claim 4, wherein the road surface information retention section includes a road surface wet detector configured to detect whether the road surface is wet.

\* \* \* \* \*